US012682374B2

(12) United States Patent
Hansen et al.

(10) Patent No.: US 12,682,374 B2
(45) Date of Patent: Jul. 14, 2026

(54) COMPUTING SYSTEM FOR GENERATING STANDARDIZED AGGREGATED DATA REPORTS ARISING FROM MULTIPLE SOURCES

(71) Applicant: Klaviyo, Inc., Boston, MA (US)

(72) Inventors: Travis Hansen, Southborough, MA (US); Jordan Gold, Somerville, MA (US); Alexander Brigham, Lowell, MA (US); Conor Dowling, Boston, MA (US)

(73) Assignee: Klaviyo, Inc., Boston, MA (US)

( * ) Notice: Subject to any disclaimer, the term of this patent is extended or adjusted under 35 U.S.C. 154(b) by 91 days.

(21) Appl. No.: 18/622,889

(22) Filed: Mar. 30, 2024

(65) Prior Publication Data

US 2025/0307868 A1      Oct. 2, 2025

(51) Int. Cl.
 *G06Q 30/0242* (2023.01)
 *G06F 16/25* (2019.01)
 *G06F 16/28* (2019.01)

(52) U.S. Cl.
 CPC ....... *G06Q 30/0246* (2013.01); *G06F 16/258* (2019.01); *G06F 16/285* (2019.01)

(58) Field of Classification Search
 CPC ................................................ G06Q 30/0246
 See application file for complete search history.

(56) References Cited

U.S. PATENT DOCUMENTS

| | | | |
|---|---|---|---|
| 7,853,961 B2 | 12/2010 | Nori et al. | |
| 8,095,532 B2 | 1/2012 | Treleaven | |
| 10,621,194 B2* | 4/2020 | Wurzer | G06F 16/2228 |
| 10,963,477 B2 | 3/2021 | Prophete et al. | |
| 11,853,271 B2 | 12/2023 | Barde et al. | |
| 12,067,008 B1* | 8/2024 | Bigdelu | G06F 16/2455 |
| 2006/0288110 A1* | 12/2006 | Alden | H04L 67/5651 709/228 |
| 2007/0027904 A1* | 2/2007 | Chow | G06F 16/283 707/999.102 |
| 2008/0215609 A1* | 9/2008 | Cleveland | G06F 16/24556 707/999.102 |
| 2012/0173519 A1* | 7/2012 | Buessow | G06F 16/24539 707/E17.014 |

(Continued)

*Primary Examiner* — Ilana L Spar
*Assistant Examiner* — Melinda Gieringer
(74) *Attorney, Agent, or Firm* — Batt IP A Law Corporation; Richard Batt

(57) ABSTRACT

A system for assisting a user compute aggregated data arising from multiple sources is programmed and operable to generate a collection of base objects by fetching base objects from the base object databases based on the classification type of the initial request; filter the collection of base objects into a filtered set of base objects by applying at least one attribute filter if present in the initial request; prepare the filtered set of base objects into a processed query for submitting to the raw data database holding the raw data; submit the processed query to the raw data database for aggregation and to obtain an aggregated result set from the raw data database; map, using a transformation matrix, each attributable ID in the aggregated result set to the corresponding attribute value; and return the updated aggregated result set to the input computing device. Related computer-implemented methods are also described.

20 Claims, 13 Drawing Sheets

(56)        References Cited

U.S. PATENT DOCUMENTS

| | | | |
|---|---|---|---|
| 2015/0278335 A1 | 10/2015 | Opitz et al. | |
| 2015/0370897 A1* | 12/2015 | Liu | G06Q 10/067 |
| | | | 707/770 |
| 2018/0357304 A1* | 12/2018 | Balasubrahmanian | |
| | | | G06F 16/252 |
| 2019/0065578 A1* | 2/2019 | Valensi | G06F 16/285 |
| 2021/0083843 A1* | 3/2021 | Salomon | G06F 21/602 |
| 2025/0225145 A1* | 7/2025 | Bhat | G06F 16/258 |
| 2025/0291836 A1* | 9/2025 | Fatal | G06F 16/383 |

* cited by examiner

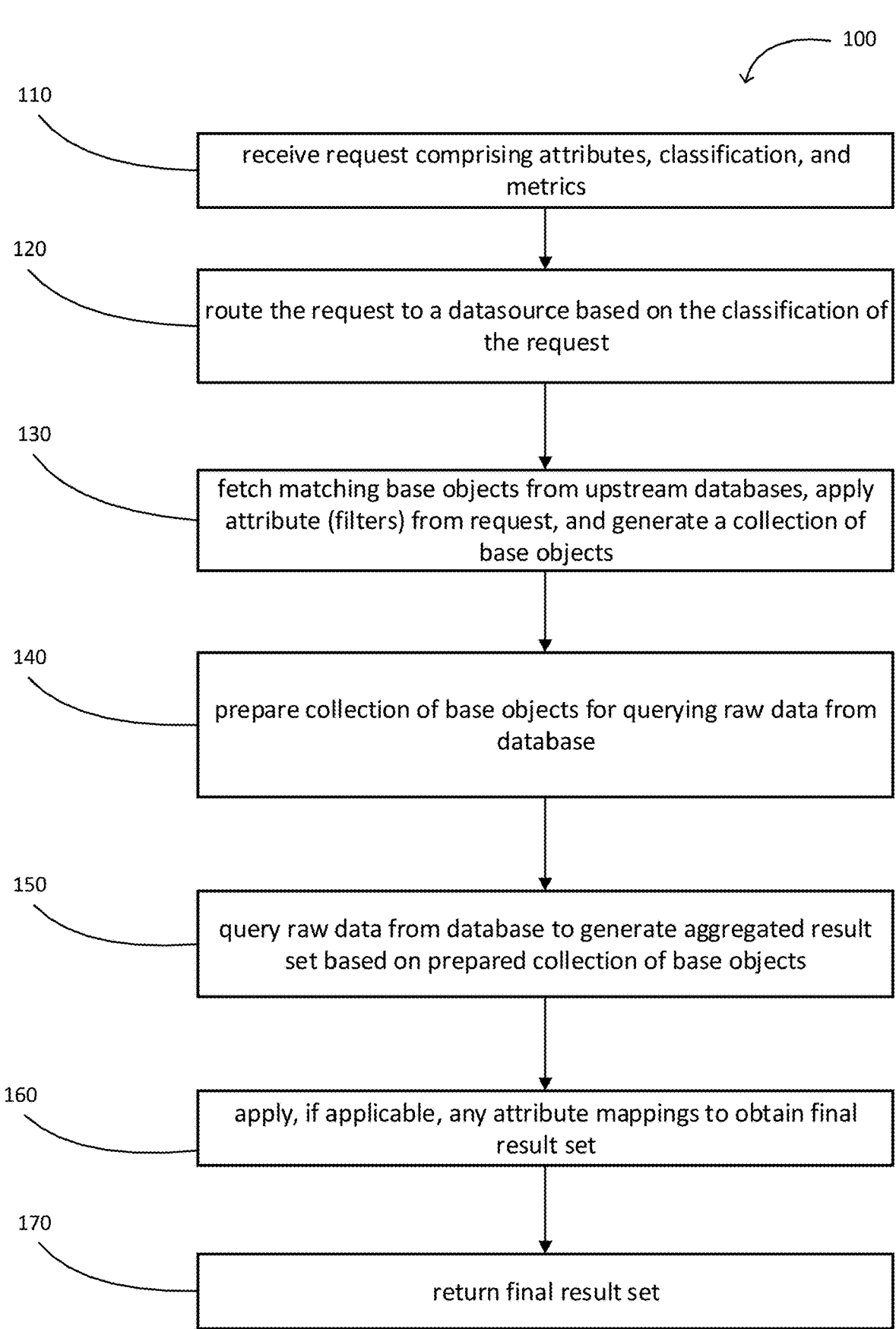

100

110  receive request comprising attributes, classification, and metrics 120  route the request to a datasource based on the classification of the request 130  fetch matching base objects from upstream databases, apply attribute (filters) from request, and generate a collection of base objects 140  prepare collection of base objects for querying raw data from database 150  query raw data from database to generate aggregated result set based on prepared collection of base objects 160  apply, if applicable, any attribute mappings to obtain final result set 170  return final result set

| Context | Campaigns |
|---|---|
| Groupings | Campaign Send Day of Week |
| Metrics | Click Rate |
| Timeframe | March |

536 — Raw Data - from Base Object DBs (subset)

| Campaign id | Attributable id | Campaign Send Day of Week |
|---|---|---|
| abc123 | abc123 | Monday |
| abc456 | abc456 | Tuesday |
| abc789 | xyz555 | Tuesday |

546 — Attribute Mapping - Stored for post OLAP query

| Attributable id | Campaign Send Day of Week |
|---|---|
| abc123 | Monday |
| abc456 | Tuesday |
| xyz555 | Tuesday |

570 — OLAP query results

| Attributable id | Clicks | Deliveries |
|---|---|---|
| abc123 | 100 | 1000 |
| abc456 | 50 | 400 |
| xyz555 | 10 | 80 |

580 — Final Resultset

| Campaign Send Day of Week | Click Rate |
|---|---|
| Monday | 10% |
| Tuesday | 12.50% |
| Tuesday | 12.50% |

FIG. 6

COMPUTING SYSTEM FOR GENERATING STANDARDIZED AGGREGATED DATA REPORTS ARISING FROM MULTIPLE SOURCES

TECHNICAL FIELD

This generally relates to computers, and more particularly, to computers for assisting users to consistently aggregate data from across multiple different sources.

BACKGROUND

Computing aggregated data is an important aspect of data science and data analytics. In commercial applications, for example, several billion events per day may need to be processed. Such events represent a wide range of information including, for example, electronic message deliveries. Each of these events can contain any number of arbitrary dimensions, or attributes, including, without limitation, a time stamp (e.g., time-date), send channel (e.g., email), location (e.g., United States), and tag ('Spring Sale'). With such a tremendous amount of data being continuously generated, the need arises to provide consistent accurate reports in order to understand the data.

Aggregating data from multiple sources, however, can be challenging for a number of reasons. First, each source may store and categorize the data differently. Second, metrics may be reported nonuniformly or inconsistently. For example, one report may calculate click rates based on total clicks while another report might use unique clicks. Some reports may use successful deliveries while others might consider total recipients.

Data inclusion time (e.g., November) is another attribute by which data can be filtered. Some pages may include events corresponding to messages that were scheduled in November, others may include events corresponding to messages which started sending in November, while other pages only include when the events for messages actually delivered during the month.

While a user may be able to resolve discrepancies by querying for a specific type of data, the user would have to be intimately familiar (or have expert level knowledge of the domain) in order to accurately query for a specific type of data to generate consistent reports across different sources of the data. This is undesirable.

Users want to be able to compute analytic data in a consistent way to avoid discrepancies; and to do so quickly and conveniently. It is desirable to be able to generate uniform reporting of aggregated metrics across multiple different sources despite the sources having different domains or service classes.

Accordingly, a system and method that addresses the above-mentioned challenges is desired.

SUMMARY OF THE INVENTION

A system for assisting a user compute aggregated data arising from multiple sources comprises: a user input computing device for generating an initial request comprising at least one of the following: a data inclusion timeframe, an attribute type for grouping, a metric, and a classification or context type; a plurality of base object databases, each base object database holding a plurality of base objects; a raw data database comprising a plurality of raw data representing recorded events, each of which has an attributable ID; and a backend processor framework.

In embodiments, the backend processor framework is programmed and operable to: receive the initial request; generate a collection of base objects by fetching base objects from the base object databases based on the classification type of the initial request, wherein each base object comprises a message ID, the attributable ID, and an attribute value for the attribute type used for grouping; filter the collection of base objects into a filtered set of base objects by applying at least one attribute filter if present in the initial request; prepare the filtered set of base objects into at least one processed query for submitting to the raw data database holding the raw data; build a transformation matrix by corresponding each attributable ID with an attribute value for the attribute type used for grouping; submit the processed query to the raw data database for aggregation and to obtain an aggregated result set from the raw data database; map, using the transformation matrix, each attributable ID in the aggregated result set to the corresponding attribute value; updating the aggregated result set by re-aggregating the mapped aggregated result set to group the aggregated result set in accordance with the first request and the attribute type for grouping; and return the aggregated result set to the input computing device.

In another embodiment of the invention, a system for assisting a user compute aggregated data arising from multiple sources comprises: a plurality of different types of base object databases, each holding a plurality of base objects; a fetcher module programmed and operable to generate a collection of base objects from the base object databases; a translation module programmed and operable to prepare the collection of base objects into a processed query for querying a raw data database holding raw data of recorded events; a resolver module programmed and operable to build a transformation matrix for corresponding each attributable ID with an attribute value for the attribute type used for grouping; and an orchestration module programmed and operable to orchestrate processing an initial request with the fetcher module, translation module, and resolver module according to the context type, data inclusion timeframe, attribute type, and metrics in the initial request.

In embodiments of the invention, the system further comprises: a plurality of types of orchestration modules, each of which is programmed and operable to orchestrate processing the initial request with the fetcher, translation, and aggregator modules according to the context, data inclusion timeframe, attributes and metrics of the initial request; and a selector module programmed and operable to receive the initial request and select the type of orchestration module based on a context of the initial request.

In embodiments of the invention, the system further comprises the raw data database. The raw data database can be an online analytical processing (OLAP) database.

In embodiments of the invention, the system further comprises an integrator, and wherein the raw data is generated by the integrator detecting sub-user behaviors.

In embodiments, the organization of the data in each of the base object databases is different.

In embodiments, the system is programmed and operable to fetch information directly from the multiple different raw object databases, or indirectly through an API, service, or another layer to modify or further translate the fetch request for the databases depending on the circumstances or environment. For example, in embodiments, the plurality of object databases can include separate databases for email, SMS, and push notifications, and optionally, a custom API, and optionally, service layer for each database where the service layer is operable to provide increased efficiency by use of control parameters including, without limitation, load balancing, partitioning, and rate limiting. Each source may have completely separate and incompatible schemas and domains.

In embodiments, the system is programmed and operable to prepare multiple queries based on a single request, depending on the metrics sought. For example, in some embodiments, when the request specifies the metric 'click-rate', a processed query is prepared and sent to the raw data database for each of 'clicks' and 'delivered.' Then, the main module or orchestration module computes the clickrate based on the aggregated results sets for clicks and delivered by dividing the number clicks by the number of delivered.

In embodiments, the system is programmed and operable to send queries directly to the raw data database, or indirectly through an APP, service, or another layer to modify or further translate the query for the raw database depending on the circumstances or environment.

In another embodiment of the invention, a computer-implemented method for assisting a user compute aggregated data arising from multiple sources comprises the steps of: providing a plurality of object databases in a cloud server environment; receiving a first request from an input computing device, wherein the first request comprises a classification type, data inclusion timeframe, an attribute type for grouping, and a metric; generating a collection of base objects by fetching base objects from at least one of the object databases based on the classification type, wherein each base object comprises a message ID, an attributable ID, and at least one attribute value; filtering the collection of base objects into a filtered set of base objects based on a at least one attribute filter if present in the first request; translating the filtered set of base objects into a first processed query for submitting to a raw data database holding raw data corresponding to recorded events; submitting the first processed query to the raw data database; computing an aggregated result set for the at least one metric; applying, if the first request includes an attribute type for grouping that is not available in the raw data database, an attribute-based conversion to the aggregated result set, and re-aggregating the aggregated result set to group the aggregated result set in accordance with the first request and the attribute type for grouping; and returning the aggregated result set to the input computing device.

In embodiments of the invention, the attribute type for grouping is selected from the following: message ID, message name, message subject, message format, message type, message status, send channel, send day of the week, tag names, and audience or segment ID. However, it is to be understood that in other embodiments, the attribute types for grouping may vary widely and have more or less types than that listed above.

In embodiments of the invention, the translating step comprises converting an ID associated with each base object of the filtered set of base objects to an attributable ID associated with each recorded event in the raw data database.

In embodiments of the invention, the attribute-based conversion is based on a stored transformation matrix that relates each attributable ID to an attribute value for the attribute type used for grouping.

In embodiments of the invention, the translating is performed by forming a message send-cohort filter based on the data inclusion timeframe.

In embodiments of the invention, the translating further comprises forming a sub-grouping based on a sub-attribute type. In embodiments of the invention, the sub-attribute type is a time interval, and optionally, the time interval is daily.

In embodiments of the invention, the attribute-based conversion is based on a stored transformation matrix to relate each attributable ID to an attribute value for the attribute type used for grouping.

In embodiments of the invention, the generating a collection of base objects is performed by generating, based on the context type, a collection of first type of base objects by fetching base objects from a first object database and generating a collection of second type of base objects by fetching base objects from a second object database, for a first pipeline and a second pipeline, respectively.

In embodiments of the invention, the translating is performed separately in each of the first pipeline and the second pipeline by (a) converting an ID associated with each first type of base object to an attributable ID associated with each recorded event in the raw data database for the first pipeline; and (b) forming a message send-cohort filter based on the data inclusion timeframe, and optionally forming a sub-grouping based on a sub-attribute type for the second pipeline.

In embodiments of the invention, querying the raw data based on the first processed query comprises querying the raw data for each of the first pipeline and the second pipeline.

In embodiments of the invention, the method further comprises, prior to the returning step, combining the aggregated result set from each of the first pipeline and the second pipeline to create an updated aggregated result set to be returned.

In embodiments of the invention, the method further comprises reducing the raw data to query in the raw data database based on characteristics of the filtered set of base objects and data inclusion timeframe.

In embodiments of the invention, the characteristics of the filtered set of base objects comprises send channel, and the method comprises reducing the raw data to query comprises excluding SMS and push-related recorded events. In embodiments of the invention, the filtered set of base objects includes SMS, and the method comprises reducing the raw queries to query to exclude email/push-related events. Alternatively, if the set of objects is SMS and Push, then the method can exclude email-related events. Indeed, any combination of the attributes can be identified and used to reduce the raw data to query based on the characteristics of the initial request.

In embodiments of the invention, the method further comprises receiving a second request different from the first request, and repeating the generating, filtering, translating, submitting, computing, and returning steps based on the classification or context type, attributes, data inclusion timeframe, and metrics of the second request to obtain a second aggregated result set.

In embodiments of the invention, the method further comprises displaying the aggregated result set.

In embodiments of the invention, the context type is selected from the group comprising campaign, flow, electronic messages, audience membership, raw events, and forms.

In embodiments of the invention, at least one metric is selected from the group comprising click rates, placed order, human open rates, messages delivered, conversion rate, loyalty points updated, and total conversions.

In embodiments of the invention, the raw data database is an OLAP datastore.

In embodiments of the invention, the method further comprises: providing a plurality of datasources in a cloud server environment; selecting a first datasource from the plurality of datasources based on the context of the first initial request; and routing the first initial request to the first datasource wherein the first datasource is operable to perform the generating, filtering, translating and submitting steps.

In embodiments of the invention, the attributable values for building the transformation matrix are fetched from the filtered set of base objects in bulk from the base object database.

In embodiments of the invention, the filtered set of base objects comprises at least 10,000 base objects, and the step of building the transformation matrix is completed in under 5 seconds.

OBJECTS AND ADVANTAGES

An object of the invention is to provide a standardized reporting computer platform or tool for assisting users to generate an aggregated result set from different sources, and optionally from heterogenous service classes and OLAP datastores.

An object of the invention is to provide a computing tool requiring the users to only learn what attributes and metrics are available in order to generate the aggregated result set, and allowing the users to ignore all domain-specific knowledge of the different sources.

Other aspects and advantages of the present subject matter will become apparent from the following detailed description taken in conjunction with the accompanying drawings, which illustrate, by way of example, the principles of the present subject matter.

DESCRIPTION OF DRAWINGS

The present subject matter is illustrated by way of example, and not by way of limitation, in the figures of the accompanying drawings in which:

FIG. 1 is a flowchart of a computer-implemented method for computing aggregated data from multiple sources, according to one or more embodiments of the present invention;

FIGS. 6-7 are tabular illustrations of various steps of a computer-implemented method for computing aggregated data from multiple sources, according to one or more embodiments of the present invention;

DETAILED DESCRIPTION

Figure 2:
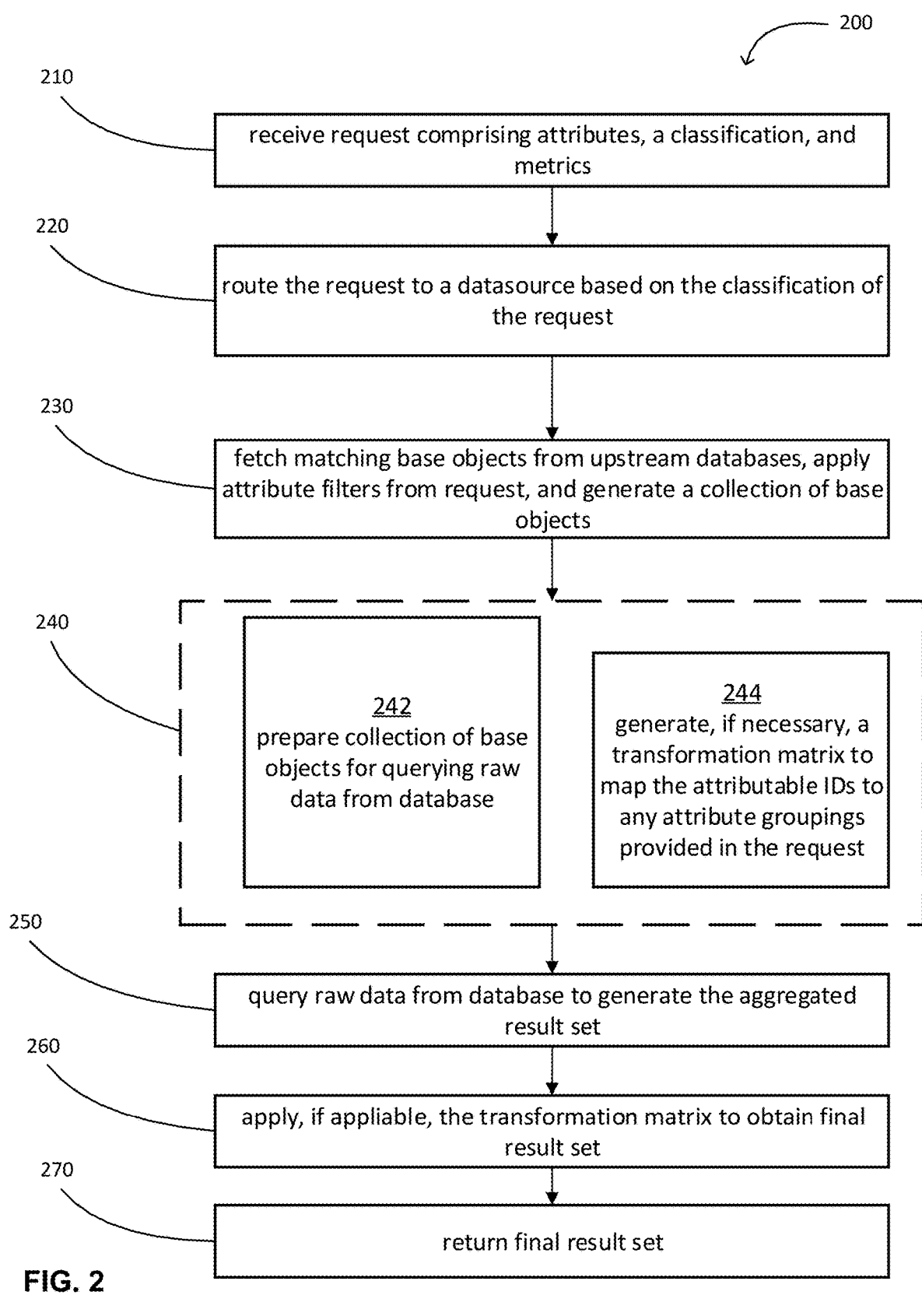
FIG. 2 is a flowchart of another computer-implemented method for computing aggregated data from multiple sources, according to one or more embodiments of the present invention.

Before the present invention is described in greater detail, it is to be understood that this invention is not limited to particular embodiments described, and as such can, of course, vary. It is also to be understood that the terminology used herein is for the purpose of describing particular embodiments only, and is not intended to be limiting, since the scope of the present invention will be limited only by the appended claims. Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges can independently be included in the smaller ranges and are also encompassed within the invention, subject to any specifically excluded limit in the stated range. Where the stated range includes one or both of the limits, ranges excluding either or both of those included limits are also included in the invention. Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described. It is noted that, as used herein and in the appended claims, the singular forms "a", "an", and "the" include plural referents unless the context clearly dictates otherwise. It is further noted that the claims can be drafted to exclude any optional element. As such, this statement is intended to serve as antecedent basis for use of such exclusive terminology as "solely," "only" and the like in connection with the recitation of claim elements, or use of a "negative" limitation. As will be apparent to those of skill in the art upon reading this disclosure, each of the individual embodiments described and illustrated herein has discrete components and features which can be readily separated from or combined with the features of any of the other several embodiments without departing from the scope or spirit of the present invention. Any recited method can be carried out in the order of events recited or in any other order that is logically possible.

All existing subject matter mentioned herein (e.g., publications, patents, patent applications and hardware) is incorporated by reference herein in its entirety except insofar as the subject matter may conflict with that of the present invention (in which case what is present herein shall prevail).

Described herein are various computing systems and computer-implemented methods for computing aggregated data from multiple sources.

FIG. 1 is an overview of a method 100 for computing aggregated data from multiple sources in accordance with embodiments of the invention. In describing the individual steps of method 100, reference shall also be made to various exemplary components shown in FIGS. 3, 4 for facilitating understanding of the invention.

Figure 3:
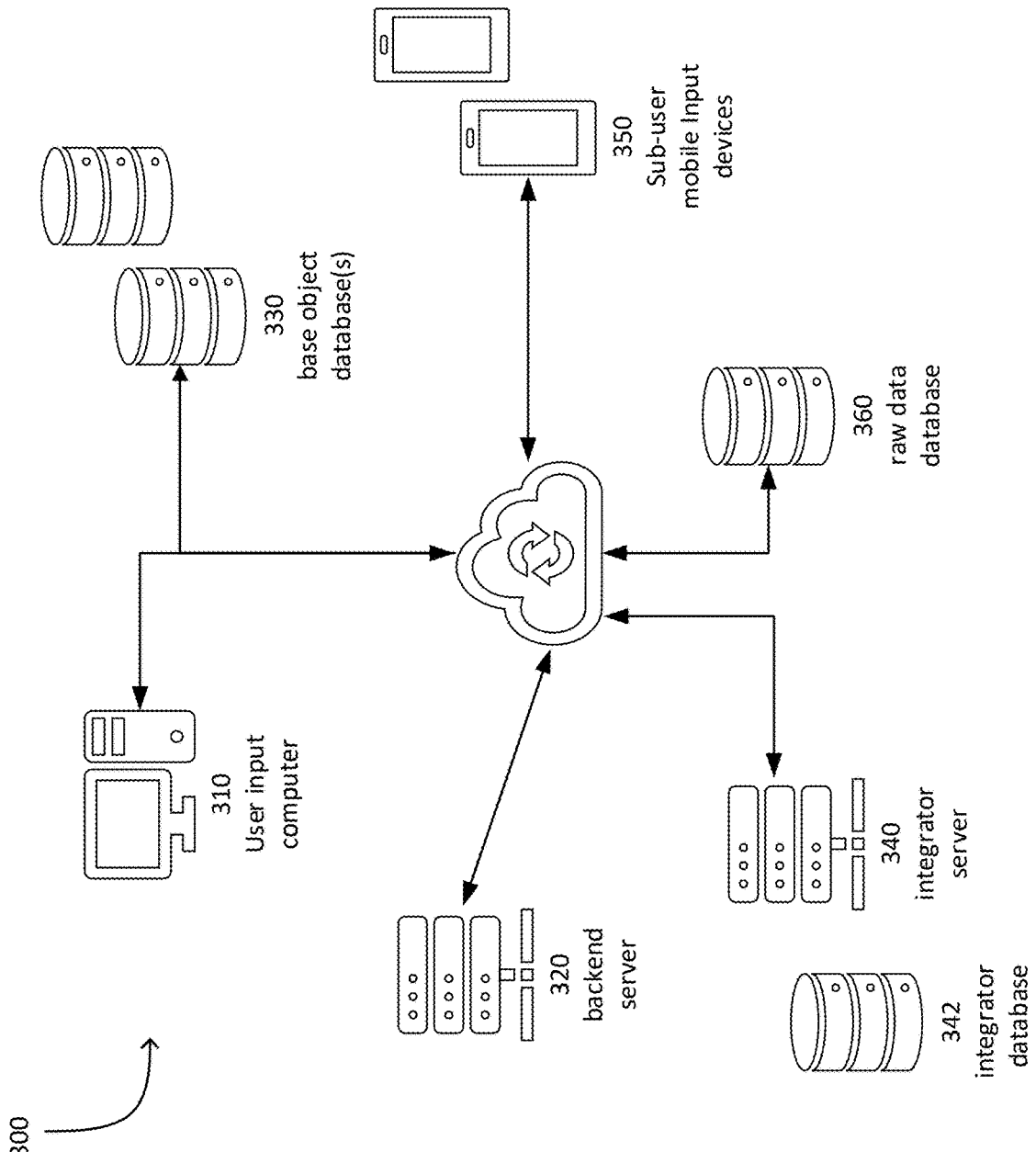
FIG. 3 is a schematic diagram of a computing system for computing aggregated data from multiple sources, according to one or more embodiments of the present invention.

Step 110 states to receive a request comprising a classification or context, attributes, and metrics. With reference to FIG. 3, this step may be performed by user input computer 310 (e.g., a laptop) being programmed and operable to create and send the request to backend server 320 via the internet. In embodiments, the request includes various information including, without limitation, a classification, data inclusion timeframe, attributes, and metrics for aggregating the data.

Examples of classifications (or types of contexts) include, without limitation, campaign, flow, messages, audience membership, raw events, and forms.

An example of a 'campaign' is a one-time activity that includes sending messages via Email, SMS, or Push notifications to a list of sub-users 350 from the user 310.

An example of a 'flow' is an ongoing activity that includes sending messages via Email, SMS, or Push notifications from the user 310 to its sub-users 350 and who take some specified action.

An example of a 'message' is an electronic message sent either as a 'campaign' or as a 'flow' via Email, SMS, or Push notifications to a list of sub-users 350 from the user 310.

An example of 'audience membership' is the tracking of the size and adds/drops of sub-users 350 that are contained in a user-defined 310 customer group, either dynamically or statically maintained.

Examples of a data inclusion timeframe include, without limitation, any time period between two dates/times, a particular hour, week, month or year, or a date/time to present.

Attributes can include attribute types or categories used for grouping the data. Examples of attribute categories or types include, without limitation, message or message ID, message name, message subject, message format, message type, message status, send channel, send day of the week, tag names, and audience or segment ID.

Each attribute category or type can include a plurality of attribute values. The attribute values are used for, amongst other things, filtering the data. For example, the attribute type 'send channel' can include, without limitation, the following attribute values: email, sms or push. The attribute type 'tag names' can include, without limitation, the following attribute values: 'Fall Fashion', Black Friday', 'Memorial Day', etc. The attribute type 'send day of the week' can include, without limitation, the following attribute values: Monday, Tuesday, Wednesday, etc. The attribute type 'status' can include, without limitation, the following attribute values: live, sending sent, draft, canceled, etc. Indeed, the invention contemplates a wide range of attribute types and a wide range of attribute values for each type of attribute.

In embodiments, the backend server 320 is programmed and operable to engage the user's computing device 310 through a website, in which the user can login, and input the request by drop-down menus, for example. In embodiments, a program (e.g., via a code editor or IDE) provides a command line interface (CLI), allowing the user to make the request. As described further herein, various filters, groups and sorting is available in embodiments. Such actions can be performed using drop down menus in a graphical user interface presented to the user on the user computing device.

Step 120 states to route the request to a context-based datasource based on the context of the request. In embodiments, this step is performed by the selector module 422 shown in FIG. 4, which can be implemented on the backend server described herein. In embodiments, this step directs the request to one of the plurality of datasources 424, 426, 428 shown in FIG. 4 and described further herein. For example, if the request includes a 'campaign'-type context, the selector module 422 routes the request to the 'campaign' datasource 424 for orchestration of the remainder of the logic rules and operations to aggregate the data.

Figure 4:
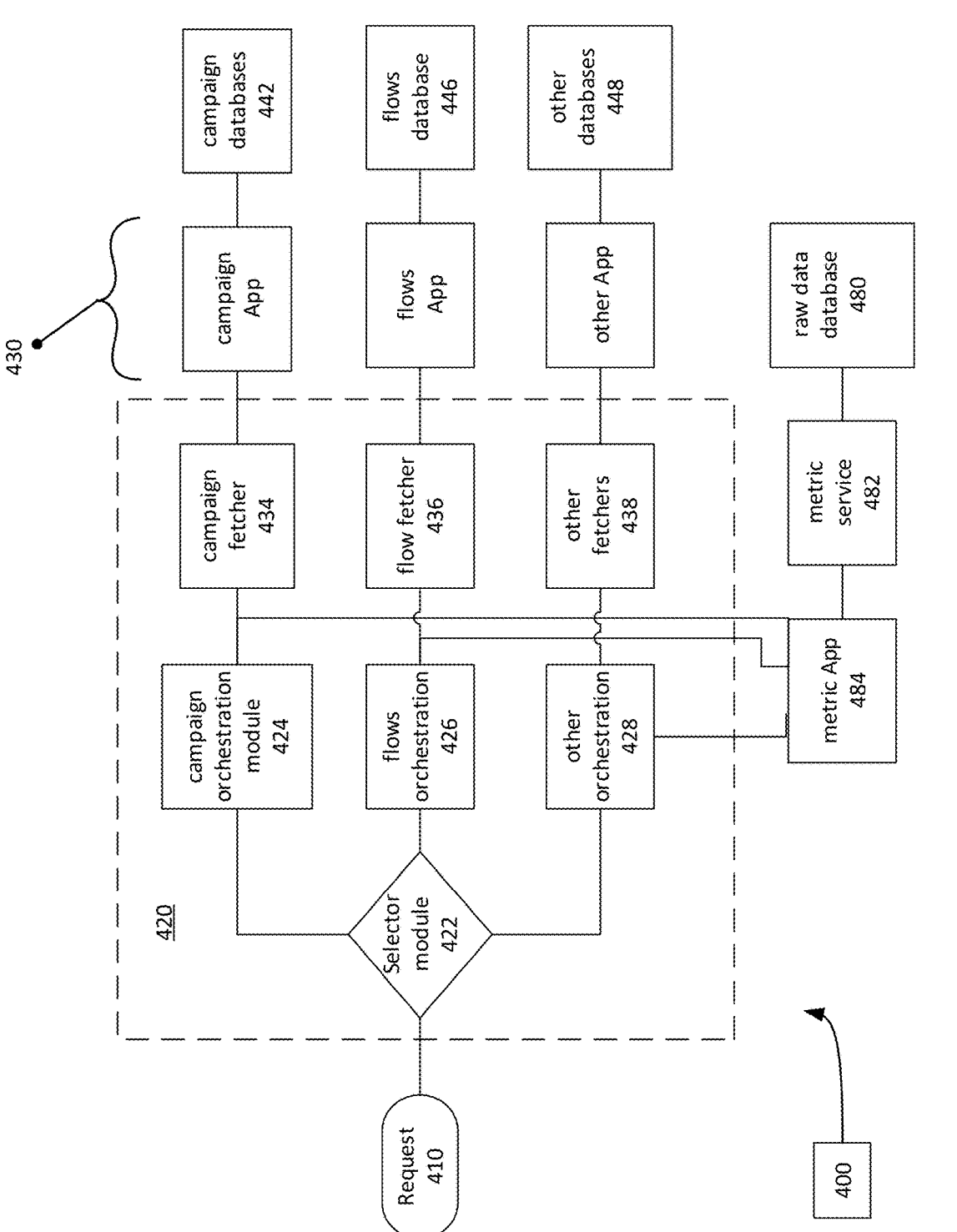
FIG. 4 is a block diagram of a computing system for computing aggregated data from multiple sources, according to one or more embodiments of the present invention.

Step 130 states to fetch the base objects from the upstream databases. This step may be performed by one or more of fetcher modules called by the datasource from step 120. With reference to FIG. 4, fetcher modules 434, 436, or 438 are programmed and operable to fetch the base objects from the upstream base object databases 440, namely, databases 442, 444, 446, and 448. FIG. 4 also shows an App layer 430 which is operable to allow the fetcher modules 430 to communicate with the databases 440.

Step 130 also states to apply attribute filters present in the request. As described further herein, the fetching modules are operable to apply filters whether intrinsic to the database or not in order to generate a collection of base objects.

Step 140 states to prepare the collection of base objects for querying the raw data from the database. As described further herein, this step is performed by the backend server 320 to convert the initial request into a processed query which can be acted upon by the raw data database 360, which in some embodiments, is an online analytical database (OLAP). The processed query can include the collection of base object IDs (translated, if necessary, into IDs recognizable in the OLAP database and discussed further herein), the data inclusion timeframe, metrics specified in the initial request, and any attribute groupings that are only available in the OLAP database.

Examples of raw data or OLAP databases are, without limitation, datastores such as ClickHouse by ClickHouse, Inc. The OLAP database 360 can include billions of recorded events generated by, for example, sub-user input devices 350 when an electronic message is sent, delivered, clicked, opened, converted, or otherwise acted upon. To this end, in embodiments, software is downloaded to the sub-user input device 350 to detect the sub-user's behaviors including, for example, time spent on an electronic message, scroll behaviors on a message, conversions arising from the message, etc. In some embodiments, geo-location information is detected and recorded for each sub-user. The sub-user's behavior is collected as an event by the integrator 340/342 (e.g., Shopify, BigCommerce, etc.), or the user, and sent and recorded to the raw database. Examples of sub-user input devices include, without limitation, computers such as laptops and desktops, mobile computing devices including smartphones, as well as tablets and smart watches.

Integrators can generally track events that are related to their domain such as, without limitation, placing an order, canceling an order, order delivery, adding subscriptions. Some integrators may also provide marketing services and can track additional data relating to the services provided.

Service providers (including the user, integrators, marketing or email service providers, or others) may also track similar or additional metrics related to its domain such as, for example, sending emails/SMS/push, opening/clicking the messages, adding/revoking consent, etc. In embodiments, the service provider provides an API for the users to send any events they want to track. The type of events that can be tracked can vary widely and in embodiments, is 'active on Site' which tracks when a sub-user visits our users' website.

In embodiments, each event is stored in the raw data database 360 and assigned an attributable ID relating (namely, 'attributing') the event to a particular message sent to the sub-user device 350. Multiple events can be assigned to one attributable ID. The invention contemplates that the native base object IDs in the base object databases 330, and depending on the context of the request, will need to be translated from the native base object ID to the attributable ID stored in the OLAP database. This can be done, if necessary, in Step 140 by the backend server or translation module, discussed further herein.

Step 150 states to query raw data from the database to generate an aggregated result set based on the prepared collection of base objects from step 140. In embodiments, the processed query generated in step 140 is sent by the backend server 320 to the OLAP database 360 which is operable to compute and return an aggregated result set based on the prepared collections of base objects, metrics, and groupings specified in the request.

Step 160 states to apply, if applicable, any attribute mappings to obtain the final result set. As described above, in embodiments, when the request requires the base object IDs to be translated from their native IDs to the IDs stored in the OLAP database 360, the aggregation from step 150 is translated back to the native IDs of the base objects consistent with the initial request.

For example, in embodiments, when a first type of context is specified by the user in the request, a forward mapping is performed at step 140 on the collection of base object IDs, and then a reverse mapping is performed at step 160 on the aggregated results of raw data to return the attributable IDs to the base object IDs.

Additionally, when a second type of classification (or context) is specified by the user in the request, and the base object ID is identical to the IDs stored in the OLAP database 360, no mapping is necessary. Embodiments of the invention are intended to include systems and methods that accommodate either type of context, as well as combinations of the different types of context as discussed herein. Embodiments of the invention are flexible in this regard because reports can be generated based on a single request and despite drawing data from multiple different database sources (each of which organizes its data differently).

Step 170 states to return the final result set. This step can be performed by sending the final result from the backend server to the user computing device 310, or to another location as specified by the user. Examples of final result sets are described further herein in connection with FIGS. 9-11.

FIG. 2 is another flowchart describing a method 200 for aggregating data from different sources similar to the method 100 described above in FIG. 1 except for step 240, which includes an additional operation.

Step 244 states to generate, if necessary, a transformation matrix for mapping attribute IDs to any attribute groupings specified in the request. This step can be performed when the initial request requires groupings and filters that are not available in the raw data database 360. The transformation matrix is built and stored to be able to map the values of the result data set back to the base objects or grouping specified in the request. Step 244 can be performed by the backend server or another programmed processor, as discussed herein.

Step 250 states to query the raw data. This step can be performed as described above in connection with step 150 of FIG. 1 and results in an aggregated result set.

Step 260 states to apply, if applicable, the transformation matrix to obtain the final result set. In embodiments, when the request requires base object IDs, groupings, filters, or other attributes that are not available in the raw data database 360, the transformation matrix from Step 244 is applied to map the values of the result data set to the base objects, sorting, filtering, and/or grouping specified in the request. After the transformation matrix has been applied, the result set is recomputed or reaggregated to generate the final result set according to the updated groupings, sorts, and filters. This step can be performed by shared code on the backend server 320.

Finally, step 270 states to return the final result set. This step can be performed by sending the final result from the backend server to the user computing device 310.

FIG. 4 is a software architecture diagram of a computing system 400 for computing aggregated data from multiple sources 440, according to one or more embodiments of the present invention.

Computing system 400 is shown including a main module 420 for receiving the initial request from a request App 410 which is operable with an input computing device to generate the initial request from a user, as described herein.

The main module 420 is shown including a selector module 422 which is operable to receive the request and route the request to one of a plurality of context-type modules based on the context of the request. In the embodiment shown in FIG. 4, main module includes a campaign module 424, flow module 426, and other module 428, each of which is operable to communicate with unique fetcher modules 434, 436, and 438 to generate a collection of base objects from different base object databases 440. In the embodiments shown in FIG. 4, the fetchers communicate with the databases 440 via an App layer 430. The databases 440 include a campaign database 442, flow database 446 and optionally other object databases 448.

In embodiments, the campaign databases 442 are configured to hold all campaign information including without limitation the campaign ID and the attribute values for each campaign. Each campaign database stores campaigns for a single send channel (i.e., email, SMS, push). These are made available via service methods that offer similar functionality to fetch campaigns by a subset of attributes. Typically, these campaign databases need to be queried separately depending on the send channel in question.

In embodiments, the flow database 446 is configured to hold all flow information including without limitation the flow ID and the attribute values for each flow. The flow data is made available via service methods that fetch flows and flow messages, which have a parent-child relationship. Each allows for filtering based on a subset of attributes.

In embodiments, data is organized differently in each of the object databases. Additionally, the data in the raw data database is organized differently than that in the object databases.

In the computing system 400 shown in FIG. 4, after the collection of objects has been generated by the fetcher module(s), the context-type module further prepares the collection of objects into a processed query for sending to the raw data database 480 and, if necessary, builds and stores a transformation matrix for mapping the attributable IDs to the base object IDs for groupings.

FIG. 4 also shows a metric service 482. Metric service 482 is in communication with the main module 420 via App 484, and is operable to take the processed query from the main module 420, and communicate the query to the raw data database 480 and optionally, to provide various optimizations including without limitation load balancing, partitioning, rate limiting, etc. For example, if the request includes the metric 'clickrate' the metric service is operable to communicate with the raw database to obtain the aggregated totals, uniques, and values. The main module then can reaggregate the results from the raw database into the 'clickrate' metric by dividing the number of 'clicks' by the number 'deliveries' to obtain a value between 0 and 1 for the clickrate. The metric service 482 is operable to accommodate a wide range of queries from the main module, query the raw database according to the protocols of the raw database, and to obtain and return the aggregated totals, uniques and values from the raw database to the main module. In embodiments, the metric service enables use of the raw database without requiring the processed query to be in SQL, or another type of computer language for interacting with databases.

The main module can then compute the desired metric to obtain the aggregated result set. The aggregated result set is updated in view of the transformation matrix by the main module 420, in particular, by the orchestration modules before being returned to the user.

Figure 5:
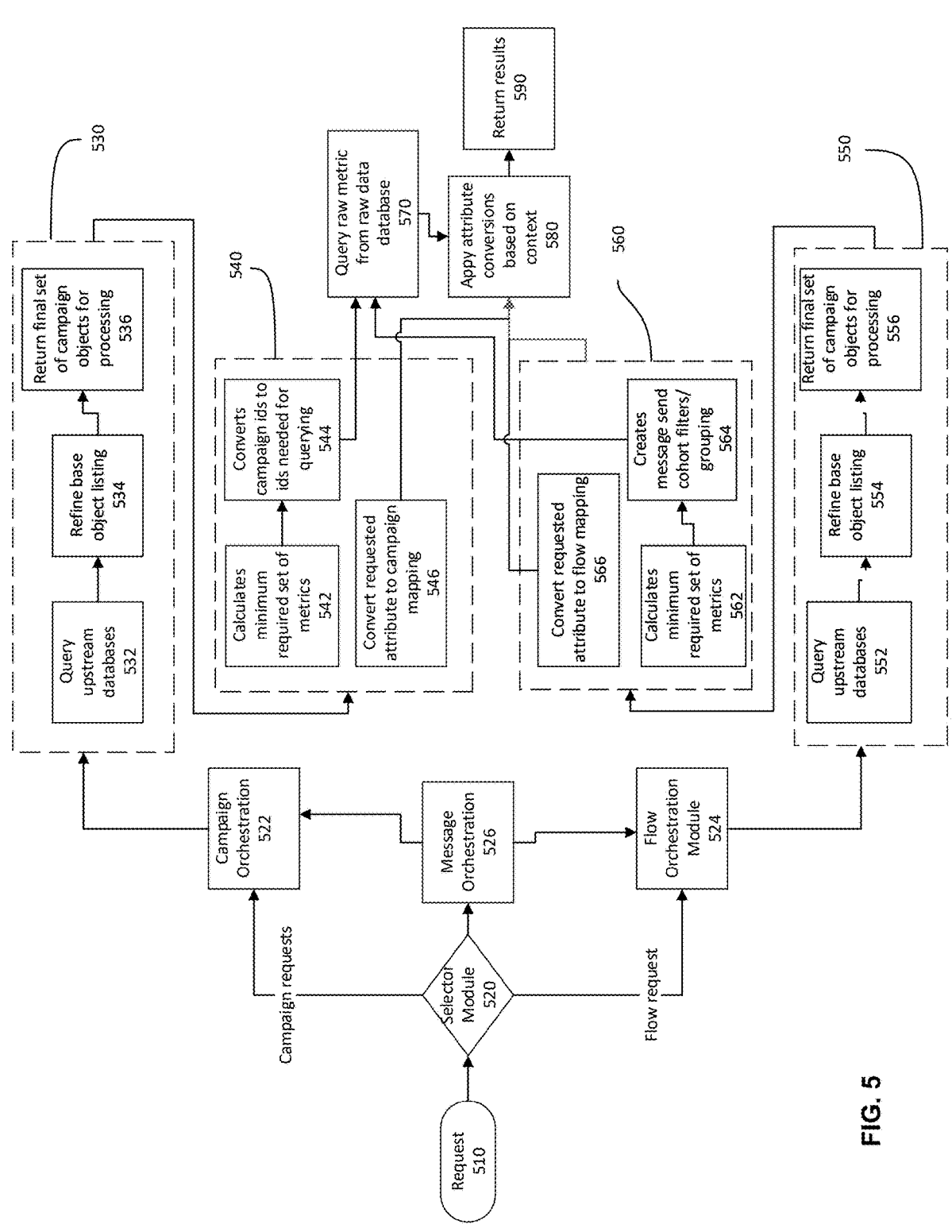
FIG. 5 is a flowchart of another computer-implemented method for computing aggregated data from multiple sources, according to one or more embodiments of the present invention.

FIG. 5 is another flow diagram illustrating further details of a computer-implemented method 500 in accordance with embodiments of the invention to aggregate data from multiple sources.

Initially, a request 510 is received by selector module 520. An exemplary request is shown in FIG. 6, and identified by the same reference numeral. The selector module 520 is programmed and operable to route the request to one of a plurality of context-type orchestration modules based on the context type in the request. Each context-type orchestration module has a set of logic rules tailored for the context-type. Examples of context-type orchestration modules include the campaign orchestration module 522, flow orchestration module 524, and the message orchestration module 526.

Campaign Orchestration Module

If the value for the context is campaign, the request is routed to the campaign orchestration module 522.

The campaign orchestration module 522 calls campaign fetcher module 530 to fetch base objects from one or more of the available object databases. In embodiments the campaign fetcher module 530 fetches base objects from the 3 campaign databases (one for each possible send channel). Each campaign base object includes a wide variety of information including, without limitation, campaign ID, campaign name, send channel, campaign status, campaign subject, the list targeted by the campaign, send day of the week, and typically attributable ID. Where the attributable ID is not present in the base object, it may be fetched from another separate database in order to build any transformation matrices, as discussed herein.

Step 532 states to query the base object databases for matching campaigns, and applies any internal-type filters that are in the request and native to the databases such as, for example, campaign send status. This step generates a listing of the campaign base objects.

Step 543 states to refine or process the listing by applying external attributes that are in the request and not available in the databases. Examples of external filters include, without limitation, minimum send times (i.e., the time the campaign started sending messages to recipients), message subject, campaign send day of the week, and tags.

Step 536 states to return the final set of campaign or base objects. This step is performed by returning the final set of campaign base objects to the translation module or layer 540. An exemplary final set of campaign base objects is shown in FIG. 6, and identified by reference numeral 536.

Next, the campaign translation module 540 is called by the campaign orchestration module to, amongst other things, prepare the filtered or final set of campaign base objects into a processed query which may be operated upon by the raw data (or OLAP) database, described further herein.

Optionally, step 542 of the translation module initially reduces the metrics or timeframe to query based on the filtered campaign base objects listing. For example, if only one campaign is included in the listing, the timeframe can be the minimum send time of the campaign through the present day. Additionally, if click rate is requested but only email based campaigns are included in the listing, the SMS metrics do not need to be included in the queries to the raw data database and vice versa. This serves to reduce the number of records to query in the raw data database.

Next, step 544 states to convert the campaign IDs to the attributable IDs needed for querying the OLAP database. As discussed herein, in embodiments, the OLAP database is not configured to directly query for the campaign IDs—the campaign IDs are not stored in the OLAP database. Step 544 serves to convert the campaign IDs to an ID which can be searched by the OLAP database, and, in preferred embodiments, is referred to as the attributable ID. With reference again to reference numeral 536 shown in FIG. 6, each campaign ID is shown with a corresponding attributable ID which can be used to form the processed OLAP query.

Campaign translation module 540 also shows a campaign resolver module 546 for generating an attribute or grouping mapping, or also referred to herein as the transformation matrix. An example of a transformation matrix is the Attribute Mapping 546 shown in FIG. 6, which maps each of the attributable IDs to the attribute requested in the request (namely, send day of week in this example) and which is not available in the raw data database. In this example, the transformation matrix 546 is a subset (or two columns) of the attributes of the collection of base objects.

The processed query is now in a form ready to be sent to the raw data database. It contains: a metric, a list of measurements (counts, uniques, values), a timeframe, dimension groupings, dimension filters, and optionally a time interval, where the dimension groupings and filters typically have the attributable IDs generated in the fetcher modules.

With reference to step 570 of FIG. 5, the processed query is sent to the raw data database for aggregating which returns a set of metrics. An example of the OLAP results 570 is the "OLAP query results" 570 shown in FIG. 6. The query results list the attributable ID, and metrics for clicks and deliveries. The query results are then transformed per step 580 by applying the stored transformation matrix. As described above, in embodiments, when the request requires base object IDs, groupings, filters, or other attributes that are not available in the raw data database, the transformation matrix is applied to map the values of the result data set to the base objects in order to sort, and/or group the data as specified in the request. After the transformation matrix has been applied, the result set is recomputed or reaggregated to generate the final result set according to the requested groupings and filters.

Figure 12:
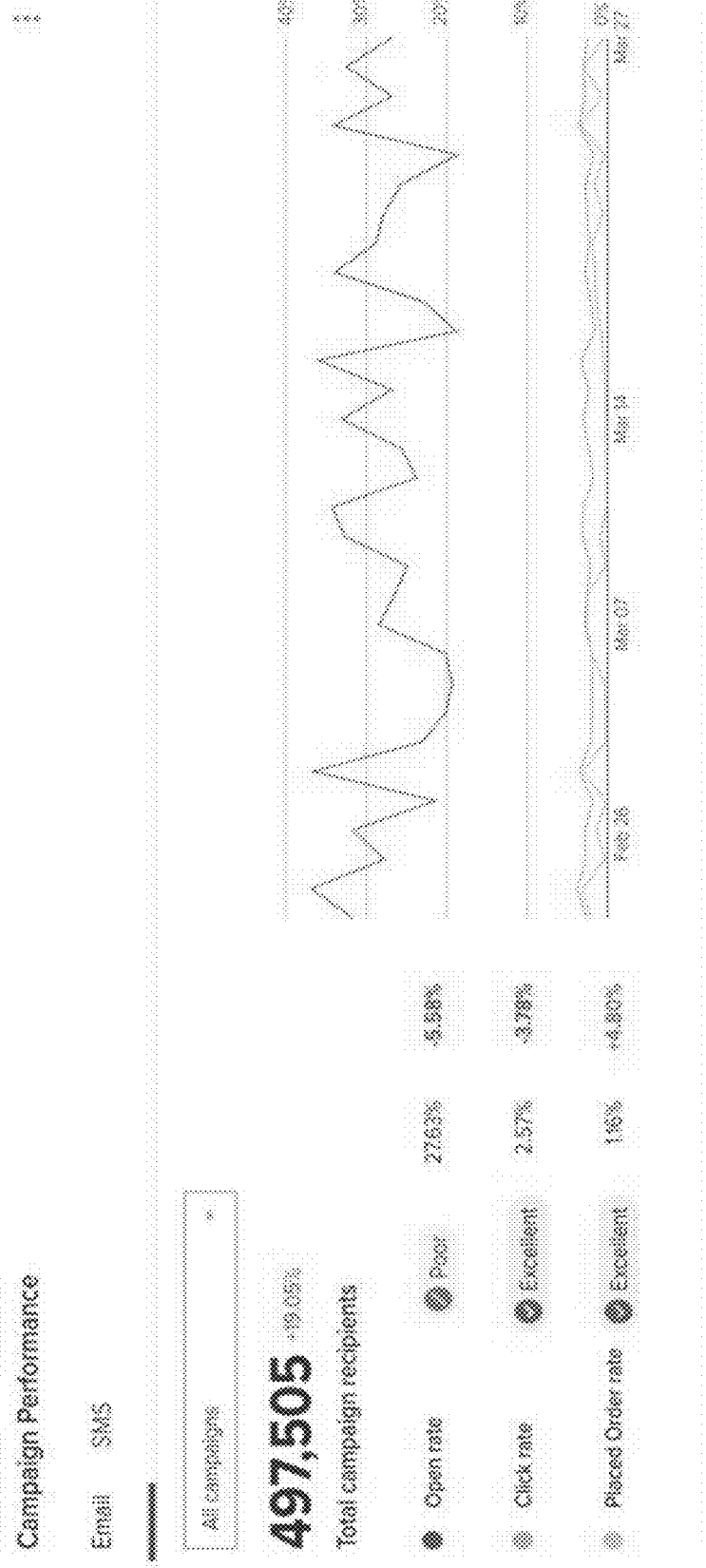

Next, the data is reaggregated according to the metrics and grouping as specified in the request. An example of a final result set 580 is shown in FIG. 6 where the attributable IDs have been converted back to the attribute grouping specified in the request (i.e., day of week) and the 'clickrate' has been computed by dividing the clicks by deliveries. The final result set 580 including the groupings and metrics are returned to the user and can be presented to the user in a wide range of charts and reports, an example of which is shown in FIG. 12, described herein.

Flow Orchestration Module

If the value for the context is flow, the request is routed to the flow orchestration module 524.

The flow orchestration module 524 calls flow fetcher module 550 to fetch base objects from one or more of the available base object databases. In embodiments the flow fetcher module 550 fetches base objects from the flow database. Each flow message base object includes a wide variety of information including, without limitation, flow ID, send channel, flow message subject, creation date, message ID (also referred to as a flow message ID or attributable ID and which, in some embodiments, is the same ID used for querying in the raw data database).

Step 552 states to query the base object databases for matching flow messages, and applies any internal-type filters that are in the request and native to the databases such as, for example, flow ids, exclude archived, and send channels. This step generates a listing of the flow message base objects.

Step 554 states to refine or process the listing by applying external attributes that are in the request and not available in the base object databases. Examples of external filters include, without limitation, flow status, flow name, and tags.

Figure 7:
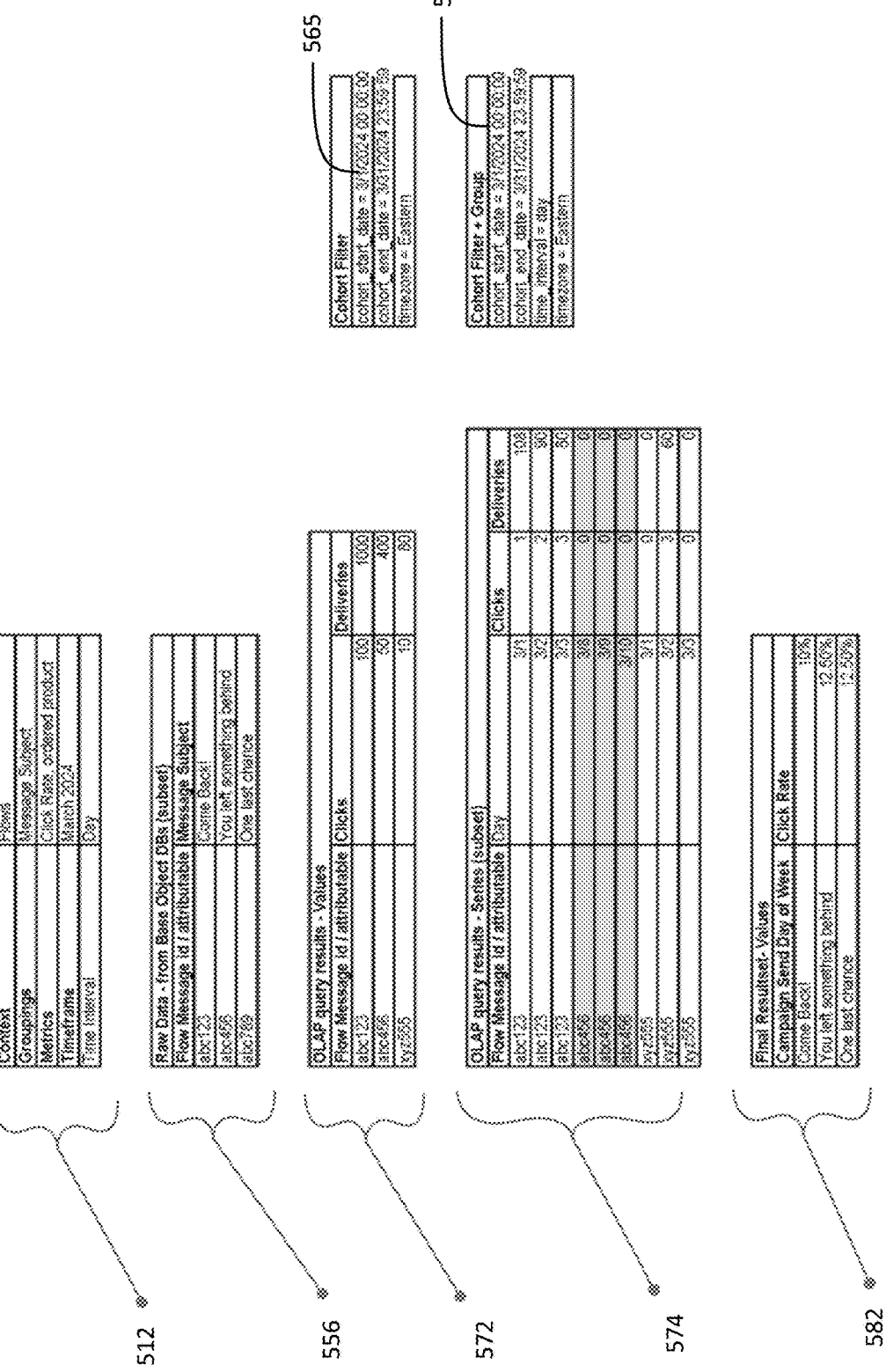

Step 556 states to return the final set of flow message or base objects. This step is performed by returning the final set of flow message base objects to the flow translation module 560. An exemplary final set of flow message base objects 556 is shown in FIG. 7.

Next, the flow translation module 560 is called by the flow orchestration module to, amongst other things, prepare the filtered or final set of flow message base objects into a processed query which may be operated upon by the raw data (or OLAP) database, described further herein.

Optionally, step 562 of the translation module initially reduces the metrics or timeframe to query based on the filtered flow message base objects listing. For example, if all flow messages in a request were created after March 1st, the timeframe can be narrowed to start on that date. Additionally, if click rate is requested but only email based flow messages are included in the listing, the SMS metrics do not need to be included in the queries to the raw data database. This serves to reduce the number of records to query in the raw data database.

Next, step 564 states to create message send cohort filters or groupings based on the request. A message send cohort is a grouping of messages that have been sent during a time interval. These cohorts are used to track all subsequent events that take place for those message sends. For example, if a message is sent on March 1, but engagement and conversion events occur on March 10, the message send cohort for each of these events will be identical (namely, March 1 in this case), which allows us to tie these pieces of data together in an aggregate manner. An example of a cohort filter is shown in FIG. 7, reference numeral 565, which limits the time of their first engagement and subsequent engagement to the month of March.

If the request (e.g., request 512 shown in FIG. 7) includes another grouping (e.g., time interval=Day) as shown in the request 512 shown in FIG. 7, the cohort filter may be modified by the time interval to prepare the processed query accordingly for the raw data database.

Flow translation module 540 also shows a flow resolver module 566 for generating a transformation matrix, which maps each of the attributable IDs to the attribute requested in the request (namely, the message subject in the example shown in FIG. 7) and which is not available in the raw data database.

The processed query is now in a form ready to be sent to the raw data database. It contains: a metric, a list of measurements (counts, uniques, values), a timeframe, dimension groupings, dimension filters, and optionally a time interval.

With reference to step 570 of FIG. 5, the processed query is sent to the raw data database for aggregating which returns a set of metrics. An example of the OLAP results is the "OLAP query results" 572, 574 shown in FIG. 7, corresponding to the metrics grouped by total and day, respectively. The query results list the attributable ID, and metrics for clicks and deliveries. The query results are then transformed per step 580 by applying the stored transformation matrix. As described above, in embodiments, when the request requires groupings, filters, or other attributes that are not available in the raw data database, the transformation matrix is applied to map the values of the result data set to the base objects in order to sort, and/or group the data as specified in the request.

After the transformation matrix has been applied, the result set is recomputed or reaggregated to generate the final result set according to the updated groupings and filters.

An example of a final result set 582 is shown in FIG. 7 where the attributable IDs have been converted back to the attribute grouping specified in the request (i.e., message subject) and the 'clickrate' has been computed by dividing the clicks by deliveries. The final result set 582 including the groupings and metrics are returned to the user and can be presented to the user in a wide range of charts and reports.

Message Orchestration Module

In embodiments, the invention includes a third orchestration module 526 to accommodate a third context. If the value for the context is message, for example, the request is routed to the message orchestration module 526

The message orchestration module 526 routes the request to both the campaign and flow orchestration modules 522, 524. Each of the steps described above in connection with the campaign and flow orchestration modules are executed independently to obtain separate results sets.

The results sets are then combined to generate the final result set for the message context report.

Figure 8:
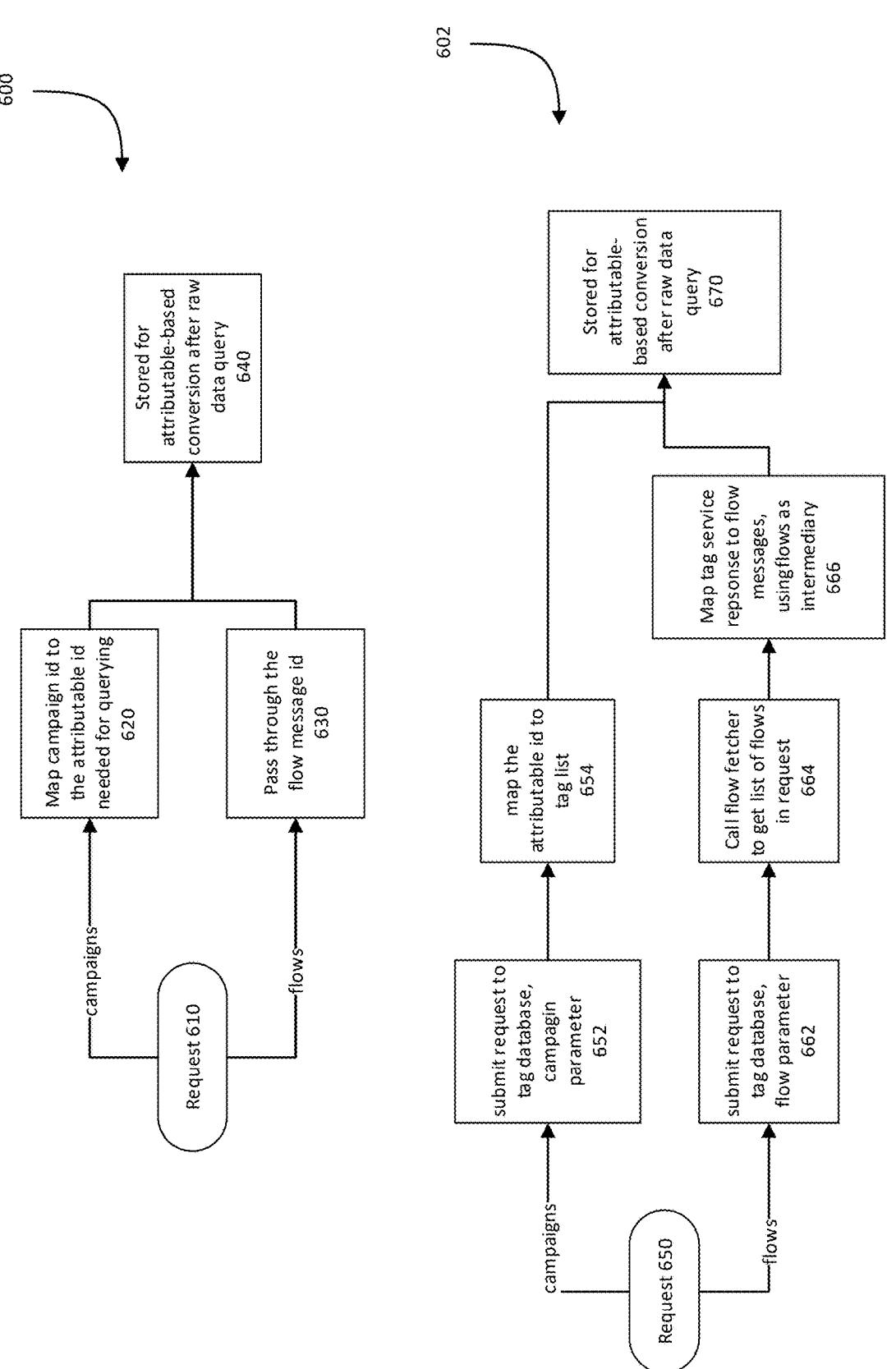
FIG. 8 is a flowchart of another computer-implemented method for computing aggregated data from multiple sources.

FIG. 8 shows two flowcharts 600, 602 illustrating the steps for computing the transformation matrix, described above, for message groupings and tag groupings, respectively. The steps to compute the transformation matrix can be implemented by, e.g., the orchestration modules described above and preferably operating on a cloud-based computer server environment.

With reference to process 600, step 610 states the request is grouped/filtered by message. As described herein, the request may include a wide variety of information including grouping and filters on one or more attribute types. Step 610 states to group by message (e.g., the message ID). If the request is based on a first type of context (e.g., campaign), the method proceeds to step 620 and the campaign IDs are mapped to the ID for querying, namely, the attributable IDs similar to the "day of the week" grouping described above in connection with FIGS. 5, 6.

With reference to Step 640, the campaign IDs and the corresponding attributable IDs are stored as the transformation matrix for later use, as described herein.

If the request is based on a second type of context (e.g., flows), the method 600 proceeds to step 630 and the flow message IDs simply pass through for the ID used for querying. In the flow-context embodiment shown in FIG. 8. no transformation matrix is needed to provide the grouping by message because the flow message ID is the same as the attributable ID.

With reference to process 602, step 650 states the request is grouped/filtered by tag list. As described herein, the request may include a wide variety of information including grouping and filters on one or more attribute types. Step 650 states to group by tag list. A tag list (e.g., 1123, 1124, etc.) is a list of tag IDs corresponding to tag names (e.g., Fall fashion, black Friday sale, etc.) If the request is based on a first type of context (e.g., campaign), the method proceeds to step 652 for generating the tag list for the campaign parameter (e.g., campaign ID). This step can be performed by the tag service database programmed and operable to provide the tag list or tag names for the campaigns. Step 654 states to map the tag list to the ID for querying, namely, the attributable IDs similar to preparing the grouping for "day of the week" described above in connection with FIGS. 5, 6.

With reference to Step 670, this tag list and the corresponding attributable IDs are stored as the transformation matrix for later use, as described herein.

If the request is based on a second type of context (e.g., flows), the method 602 proceeds to step 662 for generating a tag list for the flow parameter (e.g., flow ID). This step can be performed by the tag service database programmed and operable to provide the tag list or tag names for the flow parameter.

Step 664 states to call the flow fetcher module described above to get a list of flows specified in the request, wherein each flow includes a message or message ID used for querying the OLAP database.

Step 666 states to map the tag lists to the flow messages using the list of flows as the intermediary. (e.g., Tag list>Flow ID and Flow ID>Message ID; then Tag list>Message ID).

With reference to Step 670, this tag list and the corresponding attributable IDs (namely, the message ID) are stored as the transformation matrix for later use, as described herein.

FIGS. 9-12 are various charts or reports for presenting the final metric results to the user input computing device in accordance with embodiments of the invention. In embodiments, each of the visualizations shown in the reports may be prepared using one or more requests. In some embodiments, for example, total values are based on a first request, and the graphical charts are based on separate requests.

Figure 9:
FIGS. 9-12 are charts of reports showing various metrics, according to one or more embodiments of the present invention.

FIG. 9 is a line chart for the following metrics: open rate, click rat, ordered product (conversion) rate, and total flow recipients. Time interval: day. Data inclusion timeframe: March 1 to March 20. Filters: send channel=email. Context: Flows.

Figure 10:
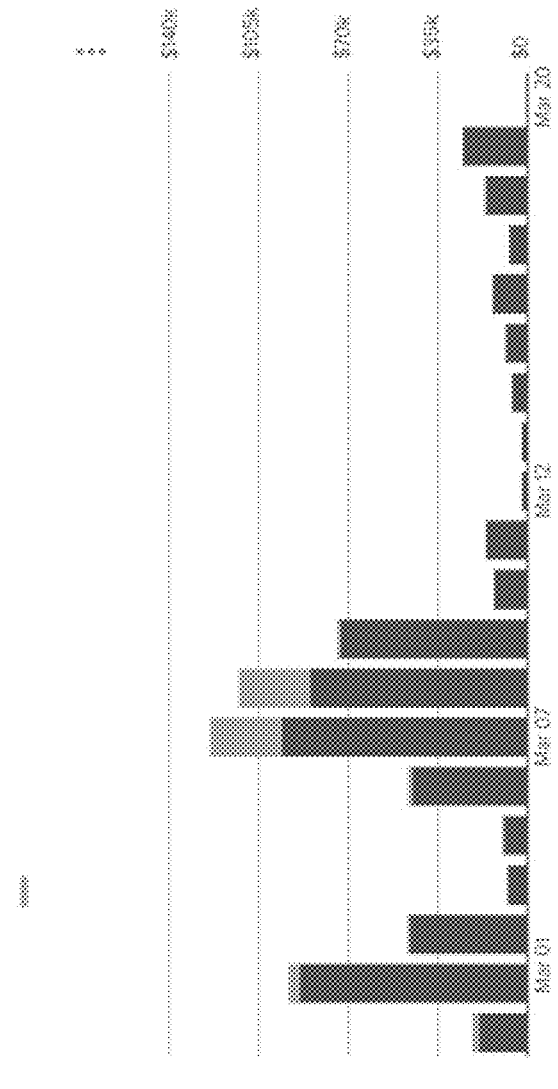

FIG. 10 is a bar chart for the following metrics: conversion value. Time interval: day. Data inclusion timeframe: March 1 to March 20. Groups: message type (namely, campaigns or flows). Context: message.

Figure 11:

FIG. 11 is a line chart for the following metrics: loyalty points updated. Time interval: day. Data inclusion timeframe: March 1 to March 20. Groups: Monthly Cohort (e.g., 2023-04, -05, -06, -07, -08). Context: Raw Event.

FIG. 12 is a line chart for the following metrics: open rate, click rate, ordered product (conversion) rate, and total campaign recipients. Time interval: day. Data inclusion timeframe: March 1 to March 27. Filters: send channel=email. Context: Campaign.

FIGS. 9-12 are intended to be illustrative and it is to be understood the systems and methods described herein can include a wide variety of graphical charts to present the final result set. Preferably, the charts and graphs can be sorted and filtered, and fine-tuned, by the user input computing device using drop down menus to build the request. Where illustrative, the data can be presented in tabular format instead of or, in addition to, the charts.

Figure 13:
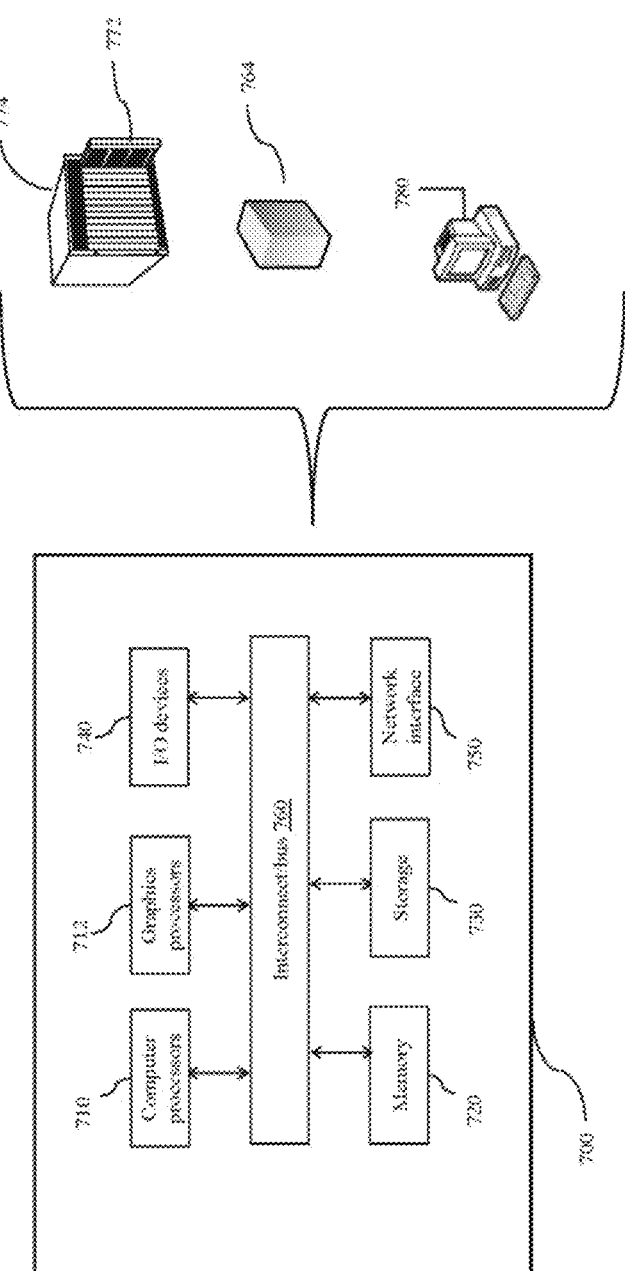
FIG. 13 is a block diagram of a computing system that can implement techniques described herein, according to one or more embodiments of the present invention.

FIG. 13 is a block diagram of a computing system 700 used to implement the techniques/processes described herein in accordance with embodiments of the invention. The computing device 700 is intended to represent various forms of digital computers, such as servers, workstations, desktops, laptops, and other appropriate computers. The components shown here, their connections and relationships, and their functions, are meant to be exemplary only, and are not meant to limit implementations of the inventions described and/or claimed herein.

The computing device 700 is shown including: a computer processor 710, graphic processor 712, memory 720, storage 730, input output ports or devices 740 and network interface 750.

The processors 710, 712, memory 720, storage 730, and network interface 750 are interconnected using various interconnect busses 760, and may be mounted on a common motherboard or in other manners as appropriate. The processor(s) can process instructions for execution within the computing device 700 to carry out the operations described herein, and including instructions stored in the memory 720 to display command lines and/or graphical information for a GUI on a display unit coupled to the network interface, I/O ports, or dedicated video card (not shown).

The memory 720 stores information within the computing device 700. In some implementations, the memory 720 is a volatile memory unit or units. In some implementations, the memory 720 is a non-volatile memory unit or units. The memory 720 may also be another form of computer-readable medium, such as a magnetic or optical disk.

The storage device 730 can provide mass storage for the computing device 700. In some implementations, the storage device 730 may be or contain a computer-readable medium, such as a hard disk device, an optical disk device, a tape device, a flash memory or other similar solid state memory device, or an array of devices, including devices in a storage area network or other configurations.

A computer program product may also contain instructions that, when executed, perform one or more methods, such as those described herein. The computer program product can also be tangibly embodied in a computer- or machine-readable medium or media, such as the memory 720 or the storage device 730.

Examples of input/output devices 740 include without limitation, a keyboard, mouse or pointing device, and printer.

Network interface 750 can include various communication ports (e.g., USB, Bluetooth, Ethernet, wireless Ethernet, WIFI).

The computing device 700 may be implemented in a wide variety of different forms. For example, it may be implemented as a standard server 764 or a desktop computer 780.

In some embodiments, multiple processors and/or multiple buses are combined, as appropriate, along with multiple memories and types of memory. Multiple computing devices may be connected, with each device providing portions of the necessary operations (e.g., as a server bank, a group of blade servers, or a multi-processor system or framework). Examples of server systems for implementing the processes and methods described herein include, without limitation, cloud data centers with rack-mounted servers, blade server systems, etc.

In some embodiments, the classification method is implemented as a group of blade servers 772 housed in a blade server enclosure system 774. In some embodiments, a blade enclosure is operable to provide additional services such as power, cooling, networking, various interconnects and management.

ALTERNATIVE EMBODIMENTS

Throughout the foregoing description, and for the purposes of explanation, numerous specific details are set forth in order to provide a thorough understanding of the described techniques. It will be apparent, however, to one skilled in the art that these techniques can be practiced without some of these specific details. Although various embodiments that incorporate these teachings have been shown and described in detail, those skilled in the art could readily devise many other varied embodiments or mechanisms to incorporate these techniques. Also, embodiments can include various operations as set forth above, fewer operations, or more operations; or operations in another order than that specifically described above. Additionally, any of the components and steps described herein may be combined with one another in any logical manner except where such components or steps would be exclusive to one another. Accordingly, the scope and spirit of the invention should be judged in terms of the claims, which follow as well as the legal equivalents thereof.

What is claimed is:

1. A computer-implemented method for assisting a user compute aggregated data arising from multiple heterogenous sources, the method comprising the steps of:

providing a plurality of heterogenous object databases in a server environment, each of which having one of a plurality of classification types, and distinct and incompatible schemas and domains;

receiving a first request from an input computing device, wherein the first request comprises one of a plurality of classification types, data inclusion timeframe, a metric, and an attribute type for grouping;

generating a collection of base objects by fetching base objects from the heterogenous object databases based on the classification type in the request, wherein each base object comprises a base object id, an attributable ID, and at least one attribute value;

filtering the collection of base objects into a filtered set of base objects based on at least one attribute filter if present in the first request;

translating the filtered set of base objects into a first processed query having a common query format for submitting to a raw data database holding raw data corresponding to recorded events, wherein the translating comprises converting the base object id to an attributable ID associated with each recorded event in the raw data database where the object id and attributable ID differ;

submitting the first processed query to the raw data database;

computing an aggregated result set for the at least one metric based on:

generating an aggregated result set by querying the raw data based on the first processed query, and applying, if the first request includes an attribute type for grouping that is not available in the raw data database, an attribute-based conversion to the aggregated result set, and re-aggregating the aggregated result set to group the aggregated result set in accordance with the first request and the attribute type for grouping; and returning the aggregated result set to the input computing device;

wherein the computing step is automatically performed regardless of the user's lack of domain-specific knowledge of the heterogeneous databases having incompatible schemas and domains.

2. The method of claim 1, wherein the attribute type for grouping is selected from the following: message ID, message name, message subject, message format, message type, message status, send channel, send day of the week, tag names, and audience or segment ID.

3. The method of claim 1, wherein the attribute-based conversion is based on a stored transformation matrix to relate/map each attributable ID to an attribute value for the attribute type used for grouping.

4. The method of claim 1, wherein the translating is performed by forming a message send-cohort filter based on the data inclusion timeframe.

5. The method of claim 4, wherein the message send-cohort filter further comprises flow message creation date.

6. The method of claim 4, wherein the translating further comprises forming a sub-grouping based on a sub-attribute type, and optionally, wherein the sub-attribute type is time interval.

7. The method of claim 1, wherein the generating a collection of base objects is performed by generating, based on the classification type, a collection of first type of base objects by fetching base objects from a first object database and generating a collection of second type of base objects by fetching base objects from a second object database, for a first pipeline and a second pipeline, respectively.

8. The method of claim 7, wherein the translating is performed separately in each of the first pipeline and the second pipeline by (a) converting an ID associated with each first type of base object to an attributable ID associated with each recorded event in the raw data database for the first pipeline; and (b) forming a message send-cohort filter based on the data inclusion timeframe, and optionally forming a sub-grouping based on a sub-attribute type for the second pipeline.

9. The method of claim 8, wherein the querying the raw data based on the first processed query comprises querying the raw data for each of the first pipeline and the second pipeline.

10. The method of claim 9, further comprising, prior to the returning step, combining the aggregated result set from each of the first pipeline and the second pipeline to create an updated aggregated result set to be returned.

11. The method of claim 1, further comprising reducing the raw data to query in the raw data database based on characteristics of the filtered set of base objects and data inclusion timeframe.

12. The method of claim 1, further comprising receiving a second request different from the first request, and repeating the generating, filtering, translating, submitting, computing, and returning steps based on the classification type, attributes, data inclusion timeframe, and metrics of the second request to obtain a second aggregated result set.

13. The method of claim 1, further comprising:

providing a plurality of datasources in a server environment;

selecting a first datasource from the plurality of datasources based on the classification type of the first initial request; and routing the first initial request to the first datasource wherein the first datasource is operable to perform the generating, filtering, translating and submitting steps.

14. The method of claim 3, further comprising building the transformation matrix prior to the submitting step, and wherein the attributable values for building the transformation matrix are fetched from the filtered set of base objects in bulk from the base object database.

15. A system for assisting a user compute aggregated data arising from multiple heterogenous sources comprises:
  a user input computing device for generating an initial request comprising: a data inclusion timeframe, a metric, and a classification type, and optionally, an attribute type for grouping;
  a plurality of heterogenous base object databases, each base object database holding a plurality of base objects, and having distinct and incompatible schemas and domains;
  a raw data database comprising a plurality of raw data representing recorded events, each of which has an attributable ID;
  a backend processor framework programmed and operable to:
    receive the initial request;
    generate a collection of base objects by fetching base objects from the base object databases based on the classification type of the initial request, wherein each base object comprises a base object ID, the attributable ID, and an attribute value for the attribute type used for grouping;
    filter the collection of base objects into a filtered set of base objects by applying at least one attribute filter if present in the initial request;
    prepare the filtered set of base objects into a processed query for submitting to the raw data database holding the raw data;
    build a transformation matrix by corresponding each attributable ID with the base object ID, and an attribute value for the attribute type used for grouping;
    submit the processed query to the raw data database for aggregation and to obtain an aggregated result set from the raw data database;
    map, using the transformation matrix, each attributable ID in the aggregated result set to the base object ID, and corresponding attribute value;
    updating the aggregated result set by re-aggregating the mapped aggregated result set to group the aggregated result set in accordance with the first request and the attribute type for grouping; and
    return the aggregated result set to the input computing device; and
  wherein the processor framework is programmed and operable to automatically generate and return the aggregated result set to the user regardless of the user's lack of domain-specific knowledge of the heterogeneous databases having incompatible schemas and domains.

16. A system for assisting a user compute aggregated data arising from multiple heterogenous sources comprises:
  a plurality of different types of base object databases, each holding a plurality of base objects, and wherein organization of the data in each of the base object databases is different, having distinct and incompatible schemas and domains;
  at least one processor; and
  a tangible computer-readable medium storing instructions thereon that, when processed by the processor, cause the processor to perform operations comprising executing:
    a fetcher module to generate a collection of base objects from the base object databases;
    a translation module to prepare the collection of base objects into a processed query comprising a consistent format for querying a raw data database holding raw data of recorded events;
    a resolver module programmed and operable to build a transformation matrix for corresponding each attributable ID with an attribute value for the attribute type used for grouping;
    a service layer configured to enhance data retrieval efficiency with the raw data database by applying control parameters including load balancing, partitioning, and rate limiting; and
    an orchestration module to orchestrate processing an initial request with the fetcher, translation, and resolver modules according to a classification type, data inclusion timeframe, attribute type, and metrics of the initial request; and
  wherein the aggregated result set is automatically generated and returned to the user regardless of the user's lack of domain-specific knowledge of the heterogeneous databases having incompatible schemas and domains.

17. The system of claim 16, further comprising:
  a plurality of types of orchestration modules, each of which is programmed and operable to orchestrate processing the initial request with the fetcher, translation, and aggregator modules according to the classification type, data inclusion timeframe, attributes and metrics of the initial request; and
  wherein the tangible computer-readable medium further comprises instructions that, when executed by the processor, cause the processor to perform operations comprising:
  executing a selector module to receive the initial request and select the type of orchestration module based on the classification type of the initial request.

18. The system of claim 17, wherein the plurality of heterogenous object databases comprises separate databases for email, SMS, and push notifications.

19. The method of claim 1, further comprising applying control parameters including load balancing, partitioning, and rate limiting for improving data retrieval efficiency.

20. The method of claim 1, wherein the plurality of heterogenous object databases comprises separate databases for email, SMS, and push notifications.

* * * * *